United States Patent [19]
Shirokura et al.

[11] Patent Number: 5,926,477
[45] Date of Patent: Jul. 20, 1999

[54] MULTISTAGE RELAY DEVICE

[75] Inventors: Yoshihiko Shirokura; Wataru Fushimi; Shuji Ito, all of Chiyoda-ku, Japan

[73] Assignee: Mitsubishi Denki Kabushiki Kaisha, Tokyo, Japan

[21] Appl. No.: 08/824,436

[22] Filed: Mar. 26, 1997

[30] Foreign Application Priority Data

Mar. 26, 1996 [JP] Japan .................................... 8-070260

[51] Int. Cl.⁶ ................................................. H04L 12/56
[52] U.S. Cl. ........................................... 370/395; 370/352
[58] Field of Search .................................... 370/352, 354, 370/356, 395, 465, 466, 471, 474, 477, 521

[56] References Cited

U.S. PATENT DOCUMENTS

| 5,297,147 | 3/1994 | Shimokasa | 375/241 |
| 5,483,527 | 1/1996 | Doshi et al. | 370/399 |
| 5,623,491 | 4/1997 | Skoog | 370/397 |
| 5,684,792 | 11/1997 | Ishihara | 370/286 |

FOREIGN PATENT DOCUMENTS

| 0 664657 A2 | 7/1995 | European Pat. Off. . |
| 2-72730 | 3/1990 | Japan . |
| 3-270424 | 12/1991 | Japan . |
| 5-83782 | 4/1993 | Japan . |
| 6-14382 | 1/1994 | Japan . |
| 2 297 881 | 8/1996 | United Kingdom . |
| WO 96/29840 | 9/1996 | WIPO . |

*Primary Examiner*—Chi H. Pham
*Assistant Examiner*—Kim T. Nguyen
*Attorney, Agent, or Firm*—Burns, Doane, Swecker & Mathis, L.L.P.

[57] ABSTRACT

When a signal is transmitted from an STM line to an ATM relay channel, the signal is compressed to be cell assembled into a cell. To the contrary, a signal from the ATM relay channel is cell disassembled into separate data and then expanded. In cases where signals are exchanged between ATM relay channels, a multistage relay device does not repeatedly execute signal compression/expansion to the signal. Switching for the above operations is achieved, utilizing a signal pattern inserted into audio data. With this arrangement, an audio one-link operation is established in the environment where an STM and an ATM coexist. Because compression/expansion processes are not repeatedly conducted, delay in relaying is avoided.

15 Claims, 12 Drawing Sheets

MULTISTAGE RELAY DEVICE

BACKGROUND OF THE INVENTION

1. Field of the Invention

The present invention relates to a multistage relay device provided between two relay channels in accordance with an asynchronous transfer mode (ATM), in which an ATM cell is transmitted from one to the other relay channel. In particular, the multistage relay device is connected to an exchange for exchanging signals in accordance with a synchronous transfer mode (STM), interconnecting communication between exchanges, so as to achieve ATM communication.

2. Description of the Prior Art

An STM communication network, such as a telephone network, is widely used all over the world. In such a telephone network, a communication channel is established between two terminals via a switch so that an audio signal is exchanged between the terminals via the communication channel. Such a switch can generally handle 64 bps STM signals, or the like, but not other STM signals or ATM signals.

In the above telephone network, a switch is generally provided for every region. Thus, in order to establish communication from one region to another, a signal must be exchanged via two switches. Such communication via switches is achieved utilizing a multistage relay device provided to the respective switches. That is, a switch on the sender side delivers a signal to its associated multistage relay device, which then transmits the signal via a relay channel to the multistage relay device of a switch on the receiver side. The multistage relay device on the receiver side supplies the signal to the receiver switch.

In the above signal transmission between multistage relay devices, in which all of the regions allotted to the respective multistage relay devices are covered for communication, a large number of signals must be transmitted. Thus, efficient signal transmission (for instance, utilizing a multiplexing process, or the like) via a relay channel is desired, and adoption of ATM communication between multistage relay devices is therefore under consideration. However, it is preferable that it remains possible to utilize an extant switch which is capable of various convenient functions together with ATM devices.

In order to meet these requirements, coexistence of a multistage relay device for ATM communication and a switch for STM communication may provide a solution. For such coexistence, however, an intermediate multistage relay device for relaying a signal between two terminal multistage relay devices must tentatively expand a signal received via a relay channel to be a 64 kbps audio signal, and this expansion may result in the degrading of an audio signal.

SUMMARY OF THE INVENTION

The present invention aims to provide a multistage relay device for achieving communication via an ATM relay channel while maintaining compatibility with a conventional STM switch. In addition, the present invention further aims to provide a multistage relay device for establishing ATM communication in which a large amount of signals can be transmitted without being repeatedly compressed/expanded.

According to the present invention, there can be provided a multistage relay device comprising: a compression circuit for compressing a signal conforming to STM to generate a compressed signal; a cell assembling circuit for cell assembling the compressed signal into a cell for outputting as a data cell conforming to ATM to a relay channel; a cell disassembling circuit for cell disassembling a data cell received from the relay channel into a cell disassembled signal conforming to STM; a restoration circuit for expanding the cell disassembled signal to generate an expanded signal; a pattern insertion circuit for inserting a given signal pattern into a signal received for outputting to an STM line; a pattern detection circuit for detecting whether or not the signal received from the STM line contains a signal pattern inserted thereto; a first sub-path circuit for supplying, without expansion, the cell disassembled signal from the cell disassembled circuit to the pattern insertion circuit when the pattern detection circuit detects the signal pattern; and a second sub-path circuit for supplying, without compression, the cell disassembled signal from the STM line to the cell assembling circuit when the pattern detection circuit detects the signal pattern.

With this arrangement, when a signal is transmitted in ATM communication under an environment where STM and ATM coexist, it is unnecessary to execute an audio compression/expansion process on the signal every time it passes through a multistage relay device. As a result, an audio one-link operation can be established. Further, a delay due to relaying can be avoided because an audio compression/expansion process is not repeatedly conducted, and that allows high-quality audio transmission.

The first sub-path circuit may include a pseudo signal generation circuit for converting a cell disassembled signal from the cell disassembling circuit to a pseudo expanded signal when the pattern detection circuit detects the signal pattern; and a first switch circuit for supplying a cell disassembled signal from the cell disassembling circuit to either the pseudo signal generation circuit or the restoration circuit.

The second sub-path circuit may include a pseudo signal restoration circuit for converting the pseudo expanded signal from the STM line to a cell disassembled signal when the pattern detection circuit detects the signal pattern; and a second switch circuit for supplying either a signal conforming to STM or a pseudo expanded signal from the STM line to either the pseudo signal restoration circuit or the compression circuit.

The pattern insertion circuit may include a first pattern insertion circuit for inserting a first signal pattern into an expanded signal from the restoration circuit; and a second pattern insertion circuit for inserting a second signal pattern into a cell disassembled signal from the first sub-path circuit. Because the pattern detection circuit switches between the first and second switch circuits, based on detection of the first and second signal patterns, it is possible to achieve a highly-accurate communication by starting communication after establishment of an audio one-link operation is a bidirectional communication path.

According to another aspect of the invention, the pattern insertion circuit may be connected to a control circuit for determining an occupation ratio of the signal pattern in the signal. With this arrangement, it is possible to establish a reliable audio one-link operation, while minimizing audio degrading due to insertion of a signal pattern.

According to a further aspect of the invention, the pattern detection circuit may be connected to a control circuit for determining the number times for a signal pattern to repeat, which is necessary to recognize insertion of the signal pattern. With this arrangement, it is possible to avoid erroneous recognition of a signal pattern by setting an increased repetition number.

According to a still further aspect of the invention, the multistage relay device may further comprise a pattern discontinuation detection circuit for supplying a signal from a compression circuit to a cell assembling circuit instead of to the second sub-path circuit while maintaining the first sub-path circuit, when the pattern detection circuit detects that the signal pattern was discontinued while a cell disassembled signal passes through the first and second sub-path circuits. With this arrangement, if an intermediate exchange generates a signal, such as a Talkie (ex. audio announcing signal), and insertion of a signal pattern is thereby discontinued, an audio one-link operation is reliably maintained in the other path. In this case, if the multistage relay device is constructed so as to comprise a signaling circuit for supplying a cell disassembled signal to the restoration circuit instead of to the first sub-path circuit, and to the compression circuit instead of to the second sub-path circuit when disconnection of a communication channel is detected, it is possible to distinguish between a signal pattern discontinuation due to insertion of a Talkie (ex. audio announcing signal) and that due to disconnection of a communication channel. The pattern discontinuation detection circuit may be constructed, instead of being provided with a signaling circuit, such that it recognizes disconnection of a communication channel upon detection of discontinuation of a signal pattern transmission and continuation of a non-audio state over a given period of time.

According to a still further aspect of the invention, the cell disassembling circuit may include a cell delay variation (CDV) absorption circuit for outputting cell disassembled data in a constant STM cycle, wherein a cell disassembled signal is supplied to the first-path circuit without passing through the cell delay variation (CDV) absorption circuit. As a result, while an audio one-link operation remains established, it is possible to avoid a process being delayed due to cell delay variation (CDV) absorption. The multistage relay device may comprise, instead of the above cell delay variation (CDV) absorption circuit, a buffer for switching between execution and non-execution of cell delay variation (CDV) absorption so as to output cell disassembled data in accordance with a constant STM cycle in response to a detection result by the pattern detection circuit.

According to a still further aspect of the invention, the cell disassembled circuit may include and AAL control circuit for controlling AAL information, wherein a cell disassembled signal is supplied to the first sub-path circuit without passing through the AAL control circuit. With this arrangement, it is possible to avoid a process being delayed due to AAL controlling in an audio one-link operation.

According to a still further aspect of the invention, the cell disassembled circuit may hold data effective for information transmission and collectively supplies the data held to the pseudo signal generation circuit. With this arrangement, it is possible to reduce the time necessary for generation and restoration of a pseudo signal in the multistage relay device through reduction of the number of times to transfer and receive signals.

According to a still further aspect of the invention, the cell disassembled circuit may be connected to a data type detection circuit for detecting that the cell disassembling circuit has received a signal other than a compressed signal, and supplies a cell disassembled signal directly to an STM line when the data type detection circuit detects that the cell disassembling circuit has received a signal other than a compressed signal. With this arrangement, audio compression/restoration or pattern insertion is not executed for all of the data cells, and that makes it possible to apply the present invention to multimedia, such as a facsimile, computer communication, or the like.

According to a still further aspect of the invention, the pattern insertion circuit and the pattern detection circuit are respectively connected to a control circuit for determining the content of the signal pattern.

BRIEF DESCRIPTION OF THE DRAWINGS

The above and other objects, features, and advantages will become further apparent from the following description of the preferred embodiment taken in conjunction with the accompanying drawings wherein.

DESCRIPTION OF THE PREFERRED EMBODIMENTS

Figure 1:
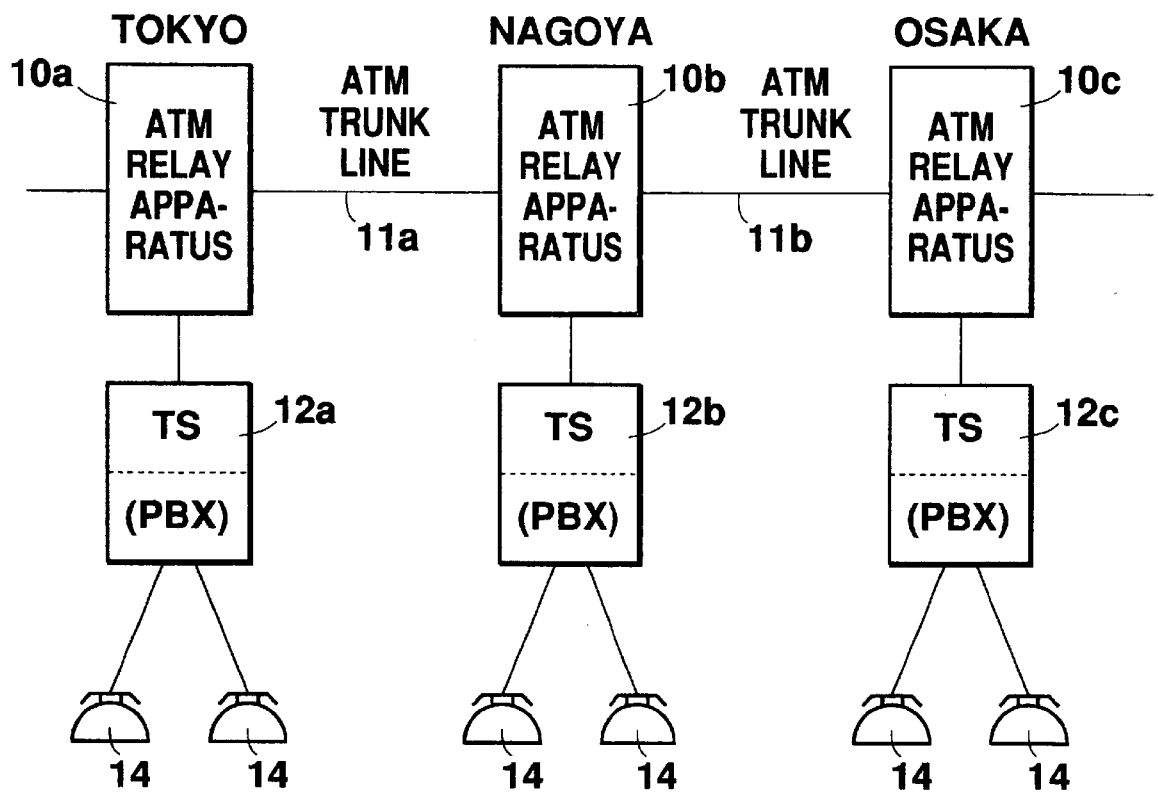
FIG. 1 is a schematic representation showing the structure of an ATM network.

FIG. 1 shows an ATM network in which a plurality of multistage relay devices 10a, 10b, and 10c according to a first preferred embodiment of the present invention are connected to one another via ATM relay channels 10a and 10b. The multistage relay devices 10a, 10b, and 10c exchange an audio signal in the form of an ATM cell via the relay channels 11a and 11b.

The respective multistage relay devices 10a, 10b, and 10c are also connected to tandem switches 12a, 12b, and 12c and PBXs. These tandem switches 12a, 12b, and 12c and the PBXs centrally manage telephones 14 which each serve as a data terminal in the concerned region, such as Tokyo, Nagoya, Osaka or the like, or one or more buildings to which they belong. These switches 12a, 12b, and 12c and PBXs can process data signals of 64 kbps only. Thus, analog signals from the telephones 14, etc., are converted into 64 kbps PCM signals.

Figure 2:
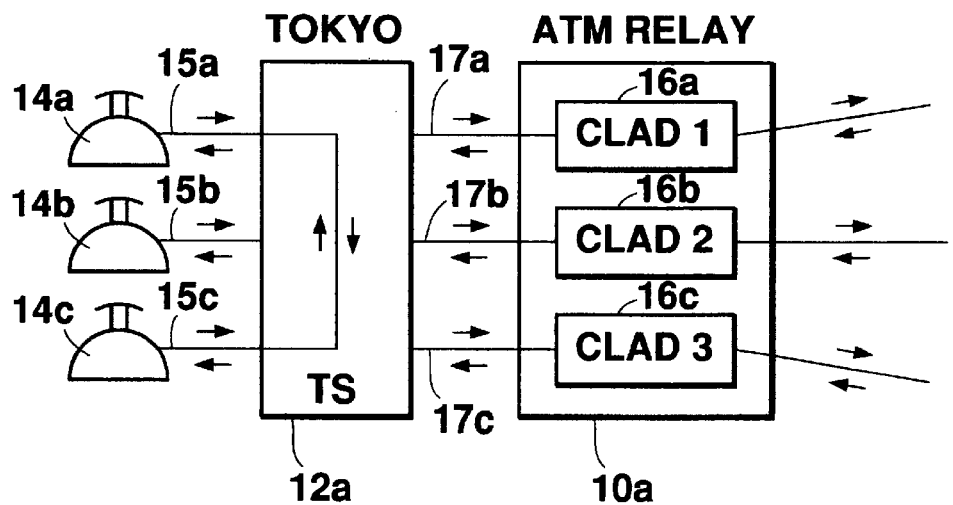
FIG. 2 illustrates an operation of ATM relaying in Tokyo.

As shown in FIG. 2, each of the tandem switches 12a, 12b, and 12c is connected to first to third telephone channels 15a to 15c which are further connected to first to third telephones 14a to 14c, respectively. The telephone channels 15a to 15c are also respectively connected to first to third CLAD channels 17a to 17c which are also respectively connected to first to third CLAD devices 16a to 16c of the multistage relay device, for instance, 10a in Tokyo. A bilateral communication path is formed in each channel. Take as an example a case where the first telephone 14a dispatches a call request addressed to the third telephone 14c in Tokyo, as shown in FIG. 2. The tandem switch 12a sets the first telephone channel 15a to be connected to the third telephone channel 15c in response to the call request, so that a data channel is established in the respective communication paths. After the establishment of a data channel, an audio signal input via the first telephone 14a is converted into a 64 kbps digital signal, which is then transmitted via the first channel 15a and the tandem switch 12b to the third channel 15c. Having received the digital signal, the third telephone 14c converts the signal into an analog audio signal for output as audio. Similar processes are followed in cases where an audio signal is conveyed from the third telephone 14c to the first telephone 14a.

Figure 3:
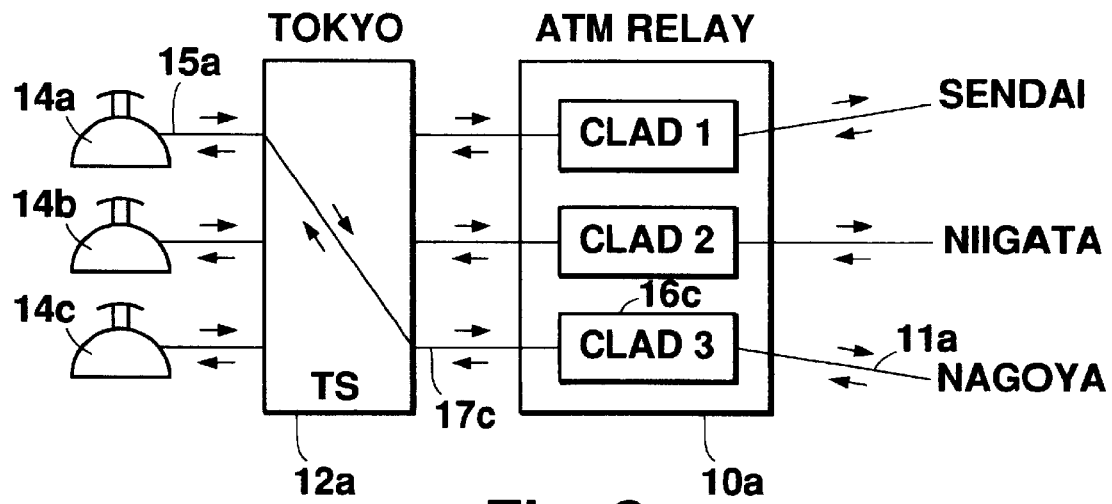
FIG. 3 illustrates an operation of ATM relaying in Tokyo.
Figure 4:
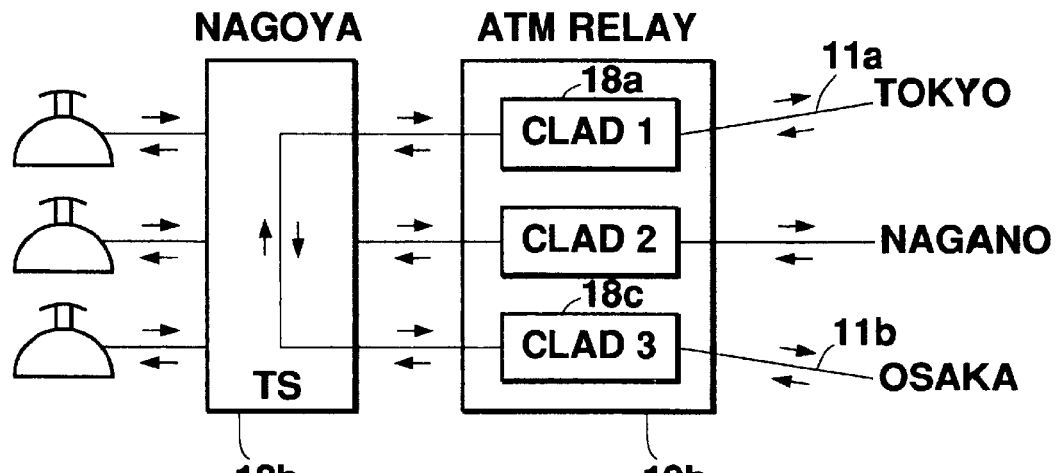
FIG. 4 illustrates an operation of ATM relaying in Nagoya.
Figure 5:
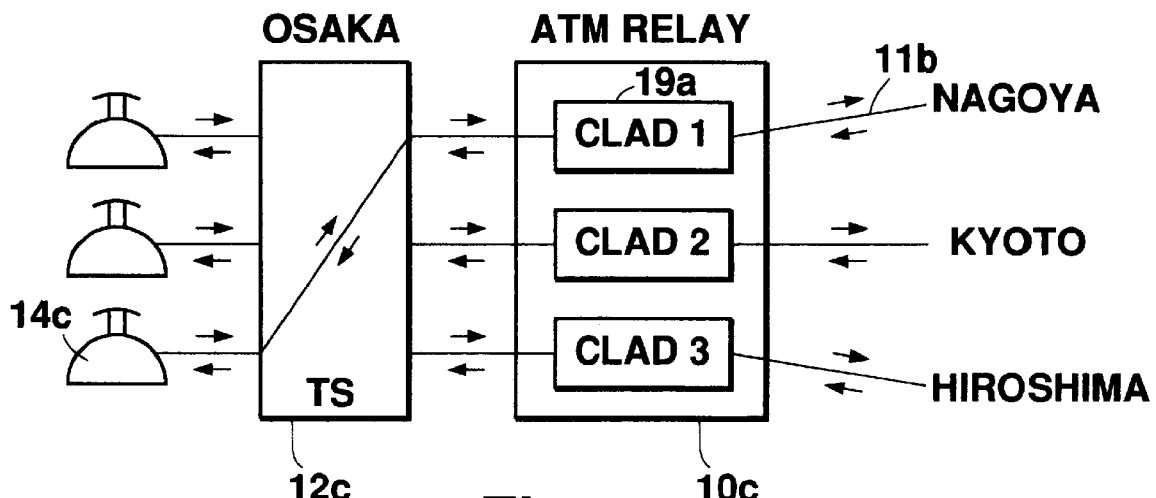
FIG. 5 illustrates an operation of ATM relaying in Osaka.

An example next taken is a case where a call request is dispatched from Tokyo to Osaka. As shown in FIG. 3, when the tandem switch 12a in Tokyo detects a request addressed to Osaka, it first connects the first channel 15a to the third CLAD device 16c coupled to a relay channel bound for Nagoya. The call request from the first telephone 14a is then cell assembled into a cell in the third CLAD device 16c and sent to Nagoya via the relay channel 11a. In Nagoya, the call request in the form of a cell from Tokyo is cell disassembled into separate data in the first CLAD 18a. Upon detection that the request is addressed to Osaka, the tandem switch 12b connects the first CLAD device 18a to the third CLAD device 18c directed to Osaka as shown in FIG. 4, so that the call request is further sent to Osaka.

In Osaka, the tandem switch 12c receives the call request from Nagoya and detects that the request is addressed to Osaka. In then connects the first CLAD device 19a to the third telephone 14c, which is the destination of the request. When the third telephone 14c responds to the request, a channel is then established between the first telephone 14a in Tokyo and the third telephone 14c in Osaka. Upon establishment of the channel, exchanging of STM signals is started between the two telephones, irrespective of presence or absence of data.

Figure 6:
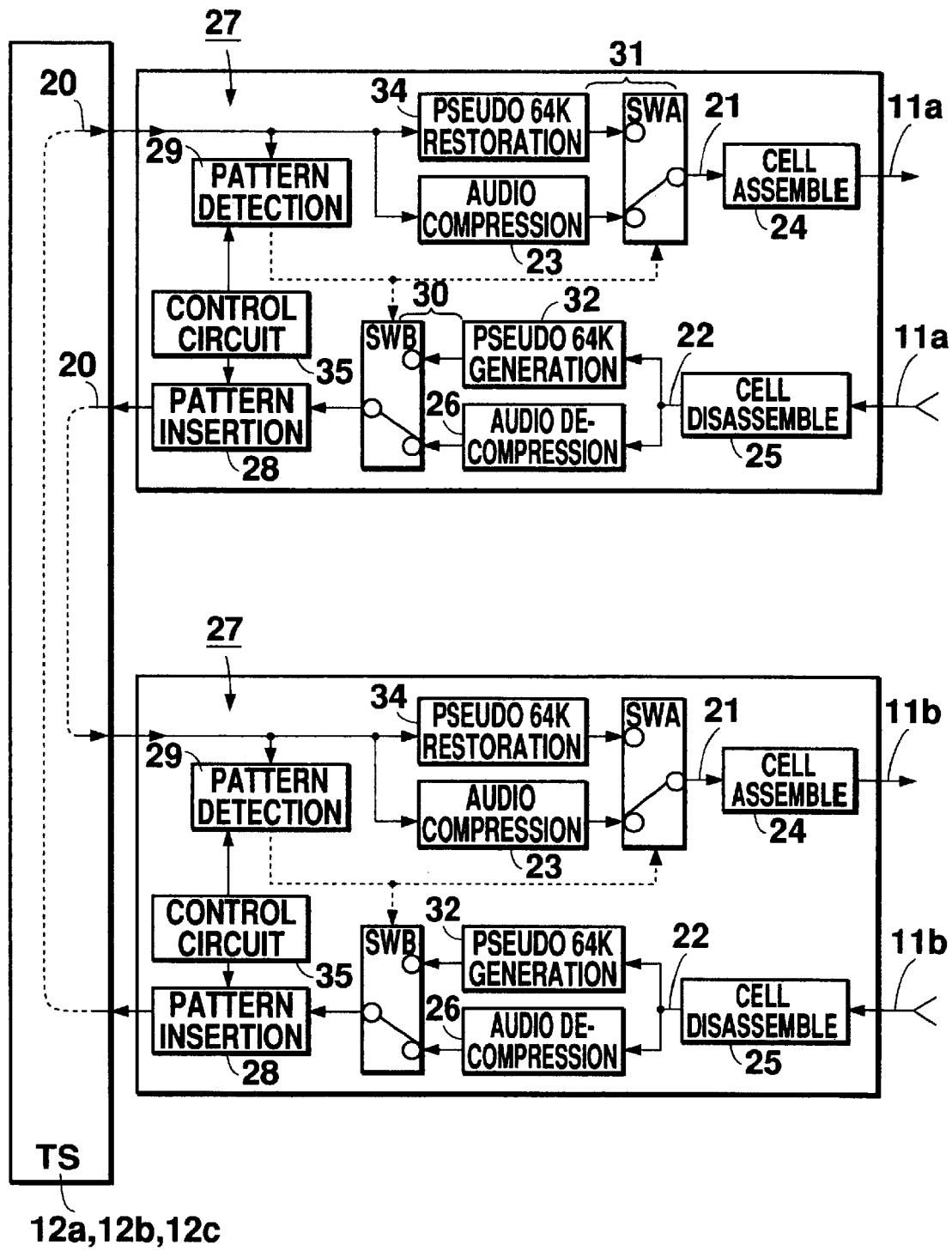
FIG. 6 illustrates the overall structure of a CLAD device according to a first preferred embodiment of the present invention.

Referring to FIG. 6, the structure of respective CLAD devices will next be described in detail. A CLAD device comprises an STM/ATM conversion path 21 for cell assembling an STM signal received via an STM line 20 from tandem switches 12a, 12b, and 12c into a cell to output to relay channels 11a and 11b, and an ATM/STM signal conversion path 22 for cell disassembling an ATM signal received via the relay channels 11a and 11b into separate data to output to the tandem switches 12a, 12b, and 12c via an STM line 20. The STM/ATM conversion path 21 includes a compression circuit 23 for compressing a 64 kbps STM signal into an 8 kbps compressed signal, and a cell assembling circuit 24 for cell assembling a compressed signal into a cell for output as a data cell conforming to ATM to the relay channels 11a and 11b. The ATM/STM conversion path 22 includes cell disassembling circuit 25 for cell disassembling a data cell received from the relay channels 11a and 11b into an 8 kbps cell disassembled signal conforming to STM, and a de-compression circuit 26 for expanding a cell disassembled signal into a 64 kbps expanded signal.

A CLAD device is provided with a one-link establishment means 27 to be used in establishing an audio one-link operation between end terminals. The one-link establishment means 27 includes a pattern insertion circuit 28 provided downstream of a cell disassembling circuit, for inserting a given signal pattern into a signal received before outputting the signal to an STM line 20, and a pattern detection signal 29 provided upstream of a cell assembling circuit, for detecting whether or not a signal pattern has been inserted into a signal received from an STM line 20. When the pattern detection circuit 29 detects a signal pattern, a cell disassembled signal from the cell disassembling circuit 25 is transmitted through a first sub-path circuit 30 in the ATM/STM conversion circuit 22, so that the cell disassembled signal is supplied to the pattern insertion circuit 28 without being expanded. Similar to the above, when the pattern detection circuit 29 detects a signal pattern, a cell disassembled signal from the STM line 20 passes through a second sub-path circuit 31, so that the cell disassembled signal is supplied to the cell assembling circuit without being compressed. In cases where an audio one-link operation is established as described above, a signal is subjected to a compression/expansion process only once while being transmitted from one terminal to another.

The first sub-path circuit 30 includes a pseudo signal generation circuit 32 for converting a cell disassembled signal from the cell disassembling circuit 25 into a pseudo expanded signal when the pattern detection circuit 29 detects a signal pattern, and a first switch circuit SWB for supplying a cell disassembled signal from the cell disassembling circuit 25 to either the pseudo signal generation circuit 32 or the de-compression circuit 26. The second sub-path circuit 31 includes a pseudo signal restoration circuit 34 for converting a pseudo expanded signal from an STM line 20 into a cell disassembled signal, and a second switch circuit SWA for supplying either a signal conformity to STM or a pseudo expanded signal from an STM line 20 to either the pseudo signal restoration circuit 34 or the compression circuit 23.

Assume a case again where communication channel is established between the first telephone 14a in Tokyo and the third telephone 14c in Osaka. In the respective CLAD devices 16c, 18a, 18c, and 19a, a signal is first transmitted through de-compression circuits 26 and compression circuits 23 because of the function of the first and second switches SWB and SWA. When the third CLAD device 16c in Tokyo receives a 64 kbps PCM signal from the STM line 20, wherein transmission of a PCM signal is started upon establishment of a data channel irrespective of presence or absence of a conversation in the case of an audio signal, the PCM signal is compressed in the compression circuit 23 and then cell assembled into a cell in the cell assembling circuit 24 to be output to the relay channel 11a. In this signal transmission, neither the first switch SWB nor the second switch SWA is switched since the pattern detection circuit 29 detects no signal patterns.

Figure 7:
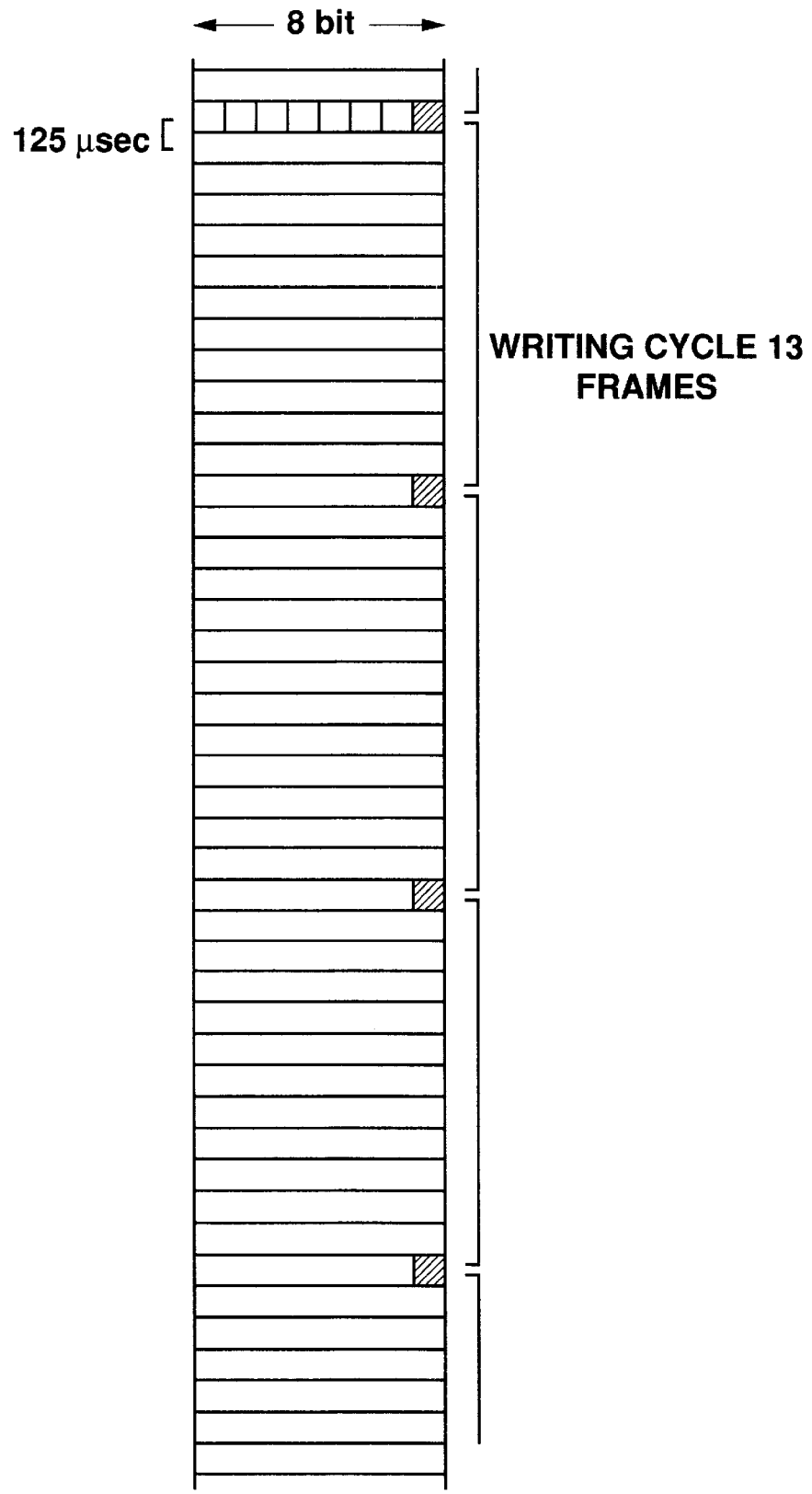
FIG. 7 illustrates a signal pattern.

In Nagoya, the data cell received via the relay channel 11a is cell disassembled into separate data in the cell disassembling circuit 25 and converted into a 64 kbps expanded signal in the de-compression circuit 26. The expanded signal has a given signal pattern inserted into it in the insertion circuit 28. A signal pattern consists of eight-bit data, such as "01011010" as shown in FIG. 7, which is overwritten onto the least significant bit of eight-bit data signal. That is, each bit of the signal pattern is successively written into a signal for every writing cycle of thirteen frames. Overwriting of the least significant bit of a signal can minimize the risk of degrading audio quality. In addition, a larger writing cycle will reduce the influence of audio degrading. The occupation ratio of a signal pattern in a signal is predetermined through downloading, or the like, from a control circuit 35. The expanded signal with a signal pattern inserted thereinto is output to an STM line 20.

The tandem switch 12b receives a 64 kbps expanded signal from the first CLAD device 18a and supplies the signal to the third CLAD signal 18c via the data channel. The pattern detection circuit 29 of the third CLAD device 18c detects a signal pattern. The pattern detection circuit 29 determines insertion of a signal pattern through repeated detection of the above signal pattern "01011010". When the pattern repeats a larger number of times, erroneous detection caused by a signal pattern happening to coincide with the unique bit data of the audio signal can be avoided more reliably. The repetition number is thus set in the range between ten and thirty times and pre-set to the pattern detection circuit 29 by controlling downloading from the control 35. Having determined the insertion of a signal pattern, the pattern detection circuit 29 has the first and second switch circuits SWB and SWA to be switched.

While a pattern is not being detected yet, a compressed signal from the compression circuit 23 is output to the relay channel 11b. Receiving a data cell, the first CLAD device 19a in Osaka cell disassembles the data cell into separate data, which are then expanded into a 64 kbps expanded signal in the de-compression circuit 26. The expanded signal has a given pattern inserted into it in the pattern insertion circuit 28 before being output to an STM line 20. The tandem switch 12c receives and then outputs the expanded signal to the third telephone 14c via the data channel.

Upon establishment of a channel, transmission of a PCM signal is also started from the third telephone 14c in Osaka. The first and second switches SWB and SWA of the first CLAD device 19a are then not switched because no signal pattern is detected. In Nagoya, a signal pattern is inserted into the signal in the third CLAD device 18c, so that the pattern is detected by the pattern detection circuit 29 in the first CLAD device 18a. As a result, the first and second switch circuits SWB and SWA are switched in the device 18a. As described above, the first and second switch circuits SWB and SWA of the CLAD devices 18a and 18c, which connect to the relay channels 11a and 11b, respectively, are switched in the intermediate relay device 10b, whereas they are not switched in the terminal relay devices 10a and 10c in Tokyo and Osaka.

After the first and second switch circuits SWB and SWA are both switched, a cell disassembled signal from the cell disassembling circuit 25 is converted into a 64 kbps pseudo expanded signal in the pseudo signal generation circuit 32, wherein the pseudo expanded signal contains an 8 kbps compressed PCM signal. The pattern insertion circuit 28 then inserts a signal pattern into the pseudo expanded signal such that the pattern is written into an empty data region in a data packet so that an audio signal is not degraded. The pseudo expanded signal is then output to an STM line 20.

Because a pseudo expanded signal from the STM line 20 hereinafter contains a signal pattern, the pattern detection circuits 29 in the first and third CLAD devices 18a and 18c in Nagoya keep detecting signal patterns, independent of whether or not the PCM signal is subjected to compression, as long as a data channel remains established. After the detection of a pattern, a pseudo expanded signal is restored to an original 8 kbps compressed signal in the pseudo signal restoration circuit 34, and the 8 kbps signal is then cell assembled into a cell to be output to the relay channels 11a and 11b.

As a result of the above processes, a PCM signal is not compressed/expanded in Nagoya, that is, at an intermediate station, so that an audio one-link operation is established between the first telephone 14a in Tokyo and the third telephone 14c in Osaka. As a result of the establishment of the audio one-link operations degrading of a signal due to repeated compression/expansion is prevented. Furthers because a cell disassembled compressed signal is cell assembled intact into a cell in the devices in the intermediate station, it is possible to reduce time necessary for data cell assembling into a cell, compared to the cases where cell disassembled compressed signals are separately compressed/expressed (before being cell assembled into a cell), and to thereby avoid a further delay due to relaying.

When a channel is disconnected by the first telephone 14a in Tokyo and the third telephone 14c in Osaka, exchanging of data signals will disappear in the first and third CLAD devices 18a and 18c in Nagoya, as a result of which detection of a signal pattern is discontinued. When the pattern detection circuit 29 does not detect any signal pattern for a period of time corresponding to five to ten successive repetition cycles, it recognizes the absence of a signal pattern and thus sets the first and second switch circuits SWB and SWA at the initial state. As a result of this switching, the first and third CLAD devices 18a and 18c restore the state where a compression/expansion process can be executed to a signal received.

It should be noted that a multistage relay device need not be limited to a single unit to be provided for an ATM signal to pass through it, and a plurality of device may be provided.

Figure 8:
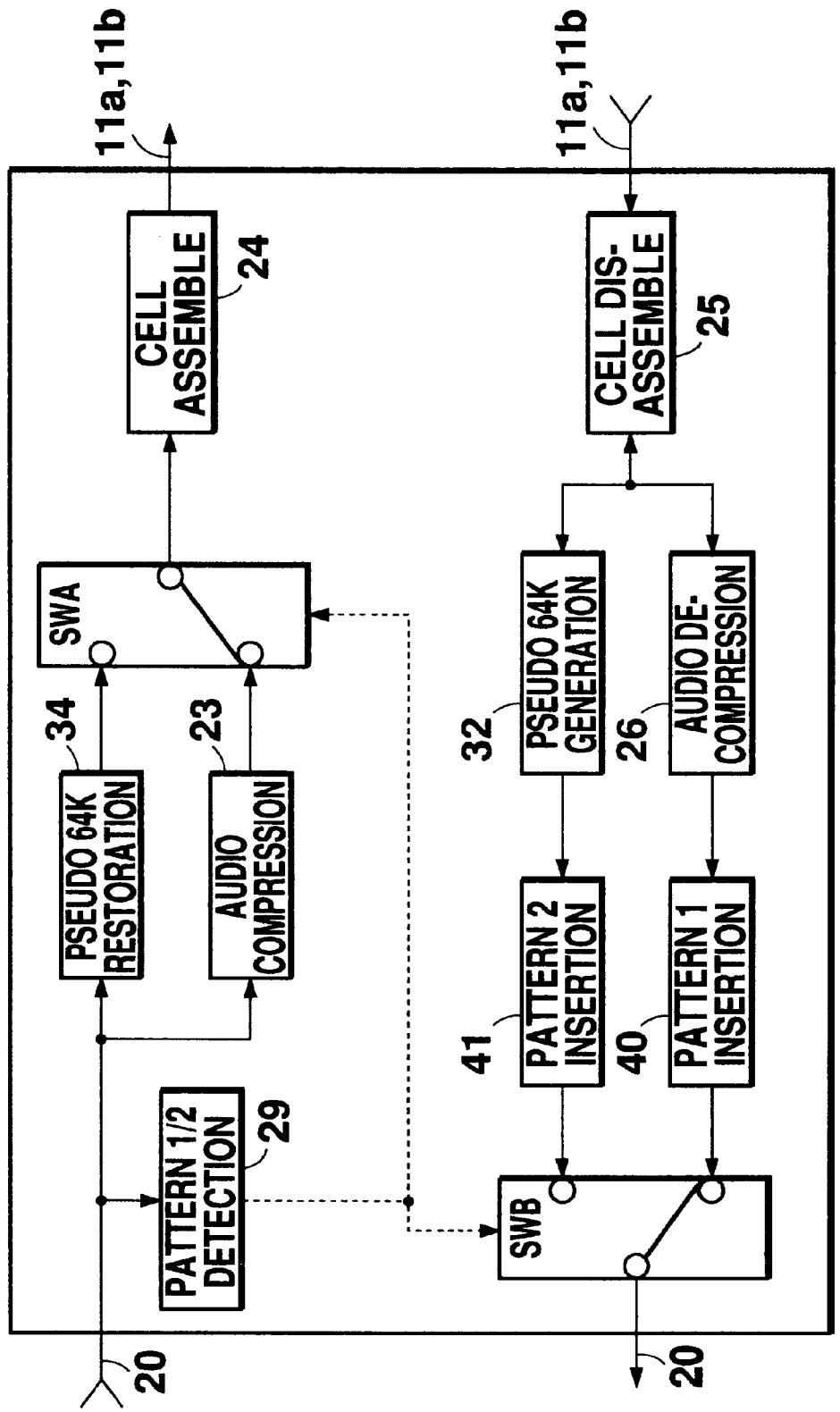
FIG. 8 illustrates the overall structure of a CLAD device according to a second preferred embodiment of the present invention.

FIG. 8 illustrates a CLAD device according to a second preferred embodiment of the present invention. The CLAD device includes a first pattern insertion circuit 40 for inserting a first signal pattern into an expanded signal from the de-compression circuit 26 and a second pattern insertion circuit 41 for inserting a second signal pattern into a pseudo expanded signal from the pseudo signal generation circuit 32. The pattern detection circuit 29 switches between the first and second switch circuits SWB and SWA, based on detection of either the first or second signal pattern. Note that structural elements having similar functions to those in the first embodiment are given the same reference numerals.

Assume that the third CLAD device 18c detects the first signal pattern inserted by the first CLAD device 18a of the relay device 10b in Nagoya. When the detection is completed, the first and second switch circuits SWB and SWA of the third CLAD device 18c are switched, so that the third CLAD device 18c thereafter outputs a cell disassembled signal with the second signal pattern inserted thereto. The second signal pattern is then detected by the first subsequent CLAD device 18a, so that the first and second switch circuits SWB and SWA in the CLAD device 18a are also switched. Starting data communication at this stage, where the first and third CLAD devices 18a and 18b both detect the second signal pattern, can prevent noise occurrence which is generally caused in communication utilizing signals in different states.

If a smaller repetition number or a smaller writing cycle is set for the second signal pattern than those for the first signal pattern in cases where two kinds of signal patterns are used, such as the above, the first CLAD circuit 18a can be switched more promptly through detection of the second signal pattern, so as to execute an audio one-link operation. In this event, a small repetition number or a small writing cycle will not degrade audio quality since the second signal pattern is inserted into a pseudo expanded signal containing an 8 kbps compressed PCM signal such that it is written into an empty data region of the data packet.

Figure 9:
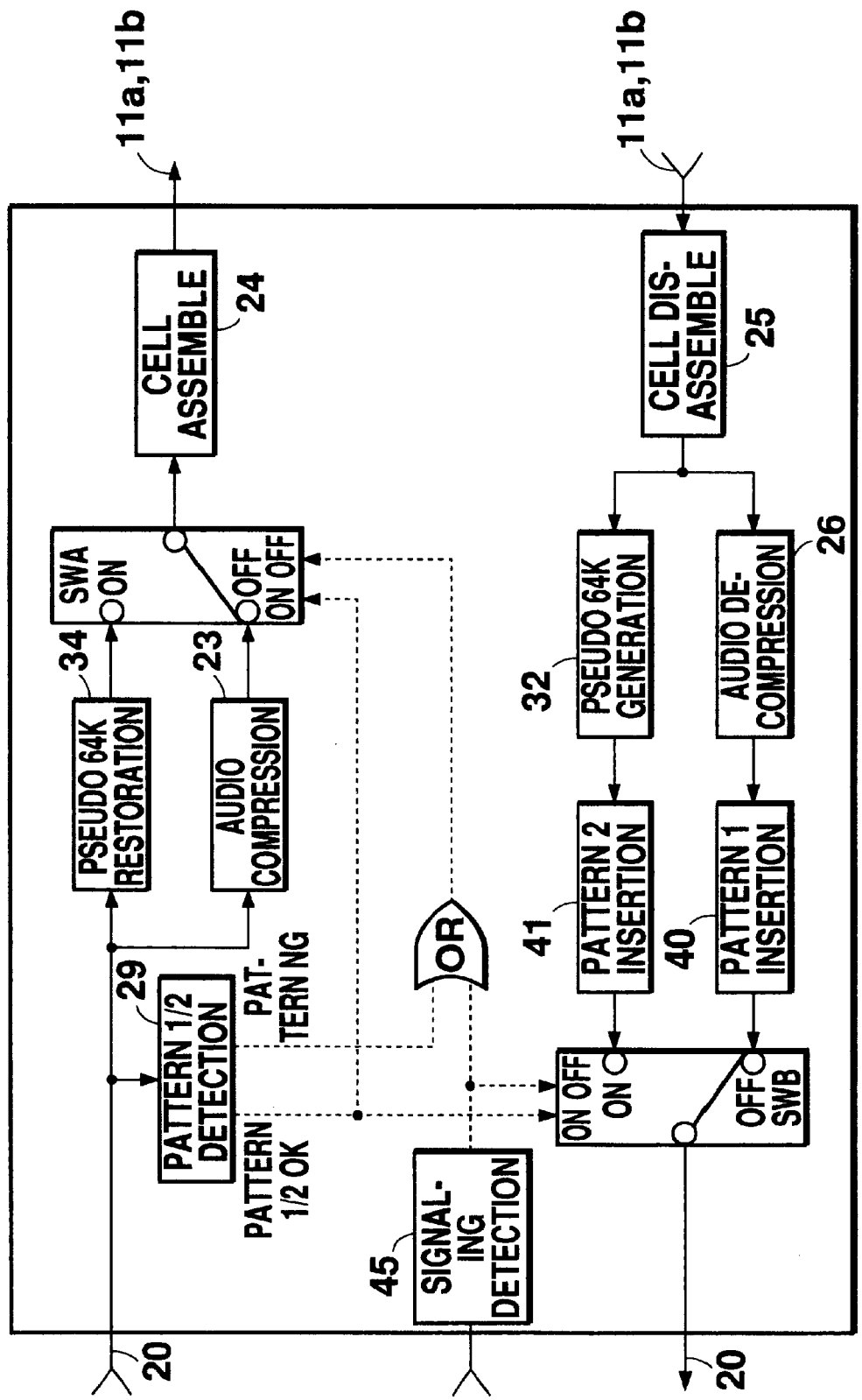
FIG. 9 illustrates the overall structure of a CLAD device according to a third preferred embodiment of the present invention.
Figure 10:
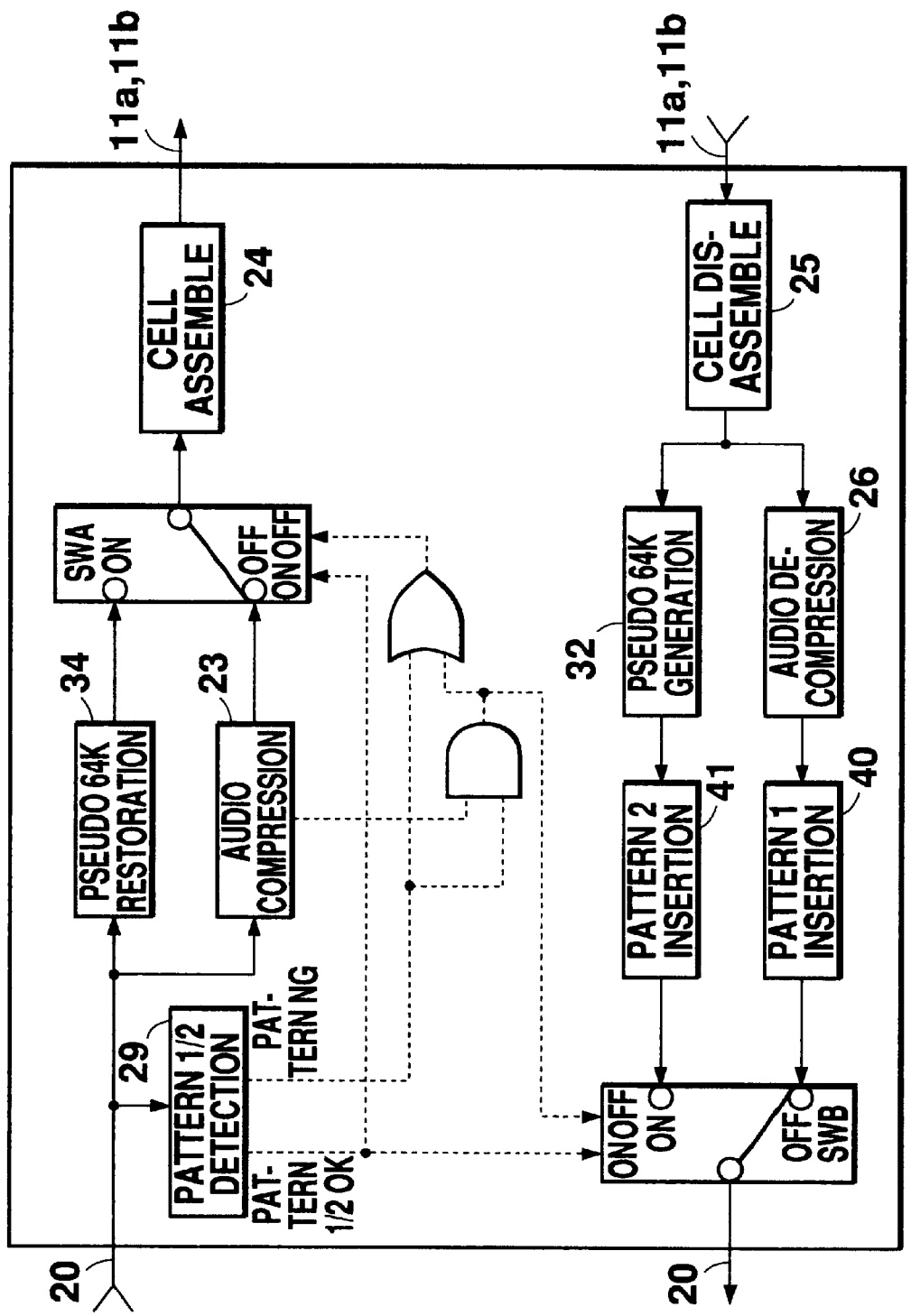
FIG. 10 illustrates the overall structure of a CLAD device according to a modified example of a third preferred embodiment of the present invention.

FIG. 9 illustrates a CLAD device according to a third preferred embodiment of the present invention. When the pattern detection circuit 29 of this CLAD device detects discontinuation of a second signal pattern after an audio one-link operation has been established with insertion of a second signal pattern into a signal, the second switching circuit SWA is switched so that a PCM audio signal from the STM line 20, such as a Talkie (ex. audio announcing signal) signal, is supplied to the compression circuit 23. Switching of the second switch circuit SWA is controlled by the pattern detection circuit 29, which acts as a circuit for detecting pattern discontinuation. In this event, since the first switch circuit SWB is not switched, the second signal pattern continues to be inserted into a pseudo expanded signal. However, in cases where the communication channel itself is disconnected, the signaling circuit 45 detects the disconnection, and the first and second switch circuits SWB and SWA are then both switched. Note that structural elements having similar functions to those in the first and second embodiment are given the same reference numerals.

Referring also to FIG. 4, assume that an audio one-link operation is established between the first and third CLAD devices 18a and 18c in the relay device 10b in Nagoya. In this situation, a cell disassembled signal with a second pattern inserted thereto is output to or received from STM lines 20 in the first and third CLAD devices 18a and 18c. Here, if the tandem switch 12b starts sending a Talkie (ex. audio announcing signal) message, such as "Avoid excessive use of the phone", to Tokyo only, the message forcefully cuts in on the flow of pseudo expanded signals, and an audio signal from Osaka is thereby discontinued.

Since a PCM Talkie (ex. audio announcing signal) signal contains no signal pattern, the pattern detection circuit 29 of the first CLAD device 18a detects discontinuation of the second pattern. Based on the detection result, the pattern detection circuit 29 sends a switching signal to the second switch circuit SWA. As a result, the compression circuit 23 compresses the PCM Talkie (ex. audio announcing signal) signal, which is then cell assembled into a cell before being output to the relay channel 11a.

In the above switching, the first switch circuit SWB of the first CLAD device 18a is not switched, so that insertion of the second signal pattern into cell disassembled signals from the cell disassembling circuits 25 continues. Thus, an audio one-link operation is maintained in the communication path from Tokyo to Osaka.

When the communication channel between Tokyo and Osaka is itself disconnected, the signaling circuit 45 detects the disconnection, and the first switch circuit SWB is then switched responding to the disconnection. As a result, a cell disassembled signal output from the cell disassembling circuit 25 will be sent to the de-compression circuit 26 in communication established thereafter. In this way, it is possible to detect whether discontinuation of a second signal pattern is due to generation of a Talkie (ex. audio announcing signal) message or disconnection of the communication channel itself. In cases where the communication channel is disconnected, the signaling circuit 45 supplies a signal to the second switch circuit SWA so as to release the second circuit SWA from an audio one-link operation.

In the foregoing third embodiment, communication channel disconnection may be known without provision of a signal circuit 45 through detection of continuation of a non-audio state for a given period of time. This judgement is made by a pattern disconnection detection circuit consisting of a pattern detection circuit 29 and a compression circuit 23. That is, if the compression circuit 23 continues to detect a non-audio state after the second switch circuit SWA was released from an audio one-link operation, it is known that the communication channel was disconnected.

Figure 11:
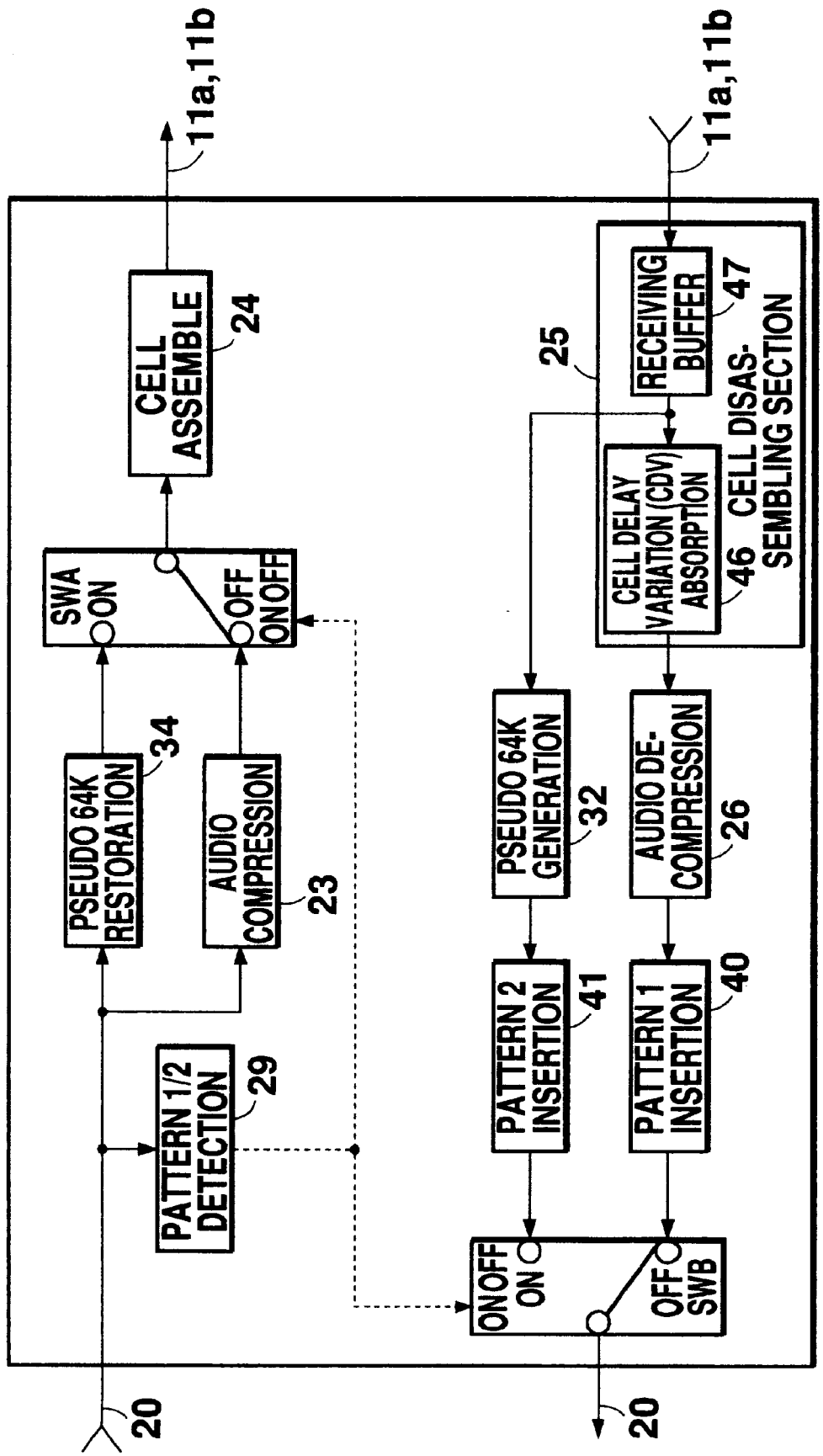
FIG. 11 illustrates the overall structure of a CLAD device according to a fourth preferred embodiment of the present invention.

FIG. 11 illustrates a CLAD device according to a fourth preferred embodiment of the present invention. The cell disassembling circuit 25 of this CLAD device includes a delay circuit 46 serving as a fluctuation absorbing circuit for outputting cell disassembled data in an STM constant cycle, and a receiving buffer 47 for holding a cell received from relay channels 11a and 11b until execution of the following process. Note that structural elements having similar functions to those in the first to third embodiments are given the same reference numerals.

With reference also to FIG. 3, a tentative increase of traffic in the third CLAD device in Tokyo will create a situation where some data have to wait in order to be processed in the cell assembling circuit 24. This waiting will cause time fluctuation in the cells to be output from the third CLAD device 16c.

Due to the above situation, the first CLAD device 18a in Nagoya shown in FIG. 4 is thereafter expected to receive successive cells with time fluctuation. Having received those cells, the receiving buffer 47 of the device 18a outputs cell disassembled cells in accordance with an interval of a cell disassembling process since the receiving buffer 47 cell disassemblies an assembled cell. Then, the delay circuit 46 outputs the cell disassembled signal in accordance with an STM cycle. After being expanded, the cell disassembled signal has a first signal pattern inserted into it before being output to an STM line 20.

Upon detection of the first signal pattern, an audio one-link operation is established in Nagoya. After establishment, a cell disassembled signal output from the receiving buffer 47 is not supplied to the delay circuit 46, but is instead sent to the pseudo expanded signal generation circuit 32 to be converted into a pseudo expanded signal. Subsequently, a second signal pattern is inserted into the signal, which is then output to an STM line 20. In this way, while an audio one-link operation remains established, it is possible to avoid a delay caused by the time necessary for cell delay variation (CDV) absorption.

Figure 12:
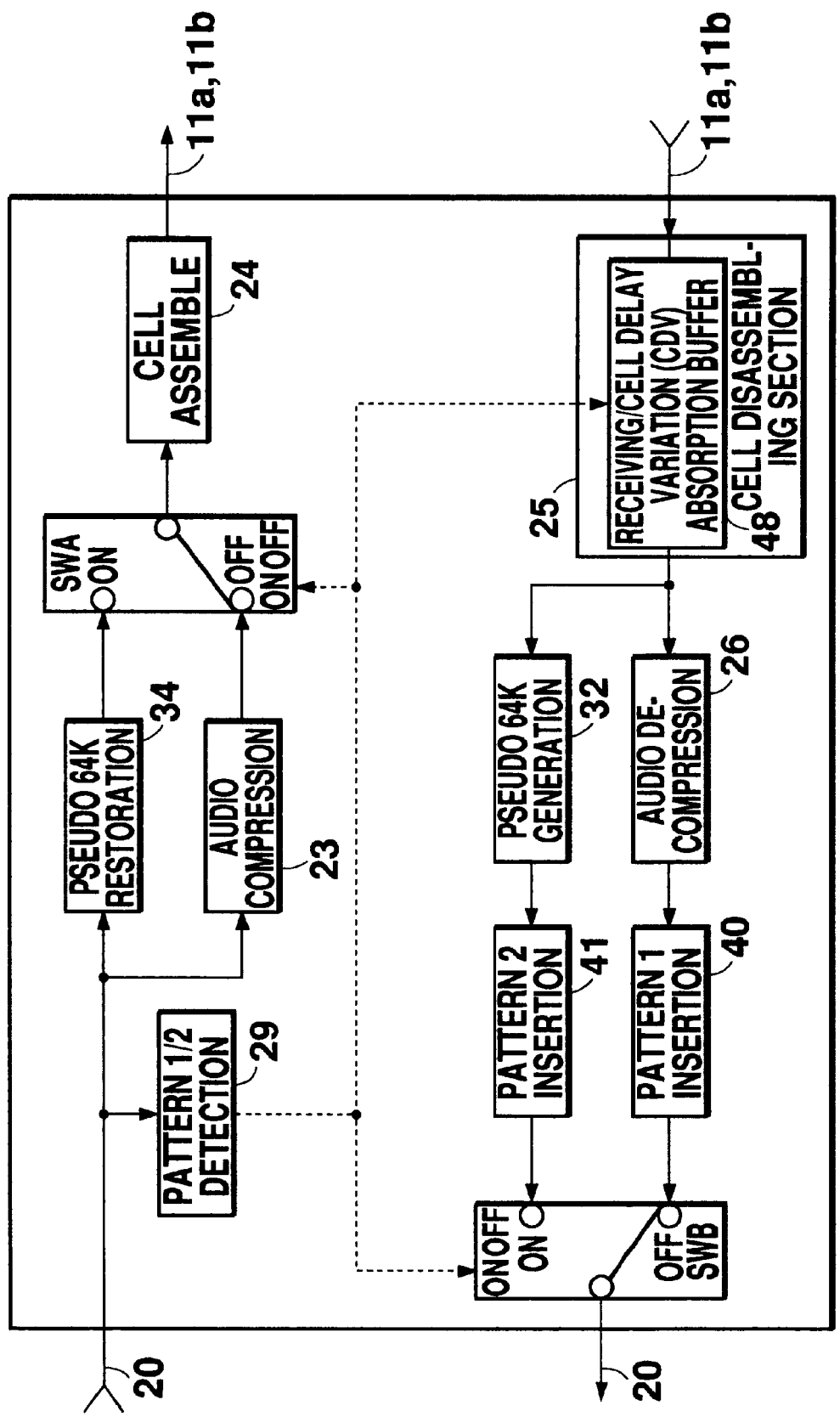
FIG. 12 illustrates the overall structure of a CLAD device according to a modified example of a fourth preferred embodiment of the present invention.

The fourth embodiment may adopt a structure where a delay circuit and a receiving buffer use a common buffer 48, as shown in FIG. 12, instead of a structure where a delay circuit 46 and a receiving buffer 47 are separately provided. In such an arrangement, the buffer 48 is switched so as to or not to absorb time fluctuation, depending on the detection result by the pattern detection circuit 29. When the buffer 48 is switched so as not to absorb time fluctuation, the buffer 48 acts as a receiving buffer. Integration of delay and receiving buffers into a single buffer 48 can reduce the number of parts and the occupied circuit area.

Figure 13:
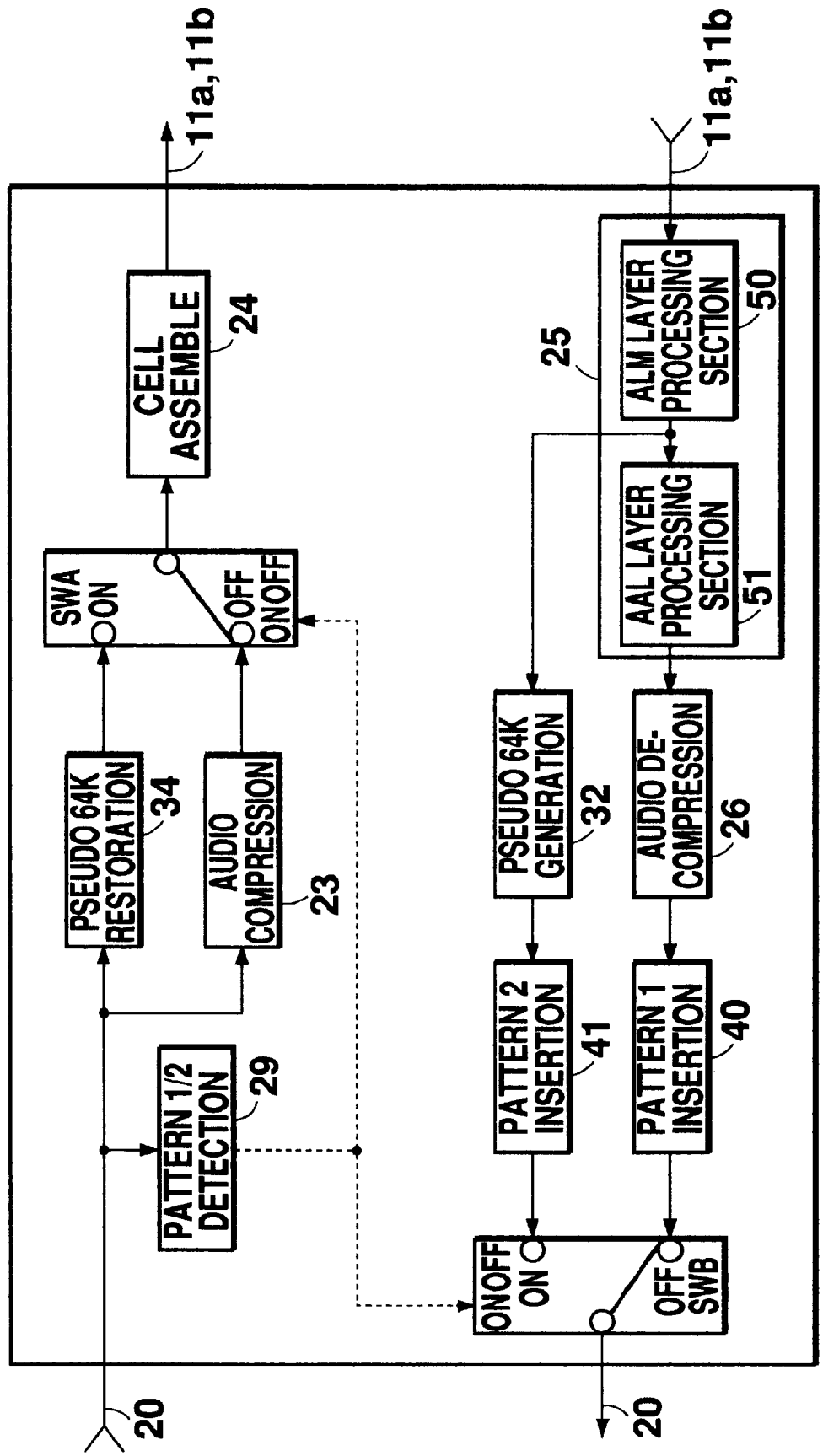
FIG. 13 illustrates the overall structure of a CLAD device according to a fifth preferred embodiment of the present invention.

FIG. 13 illustrates a CLAD device according to a fifth preferred embodiment of the present invention, in which the cell disassembling circuit 25 includes an ATM layer control circuit for controlling information of an ATM layer and an AAL control circuit 51 for controlling AAL information. The ATM layer control circuit 50 recognizes the top of a data cell and executes synchronism among the cells. The AAL control circuit 51 controls the sequential numbers of cells headers and the audio control information of synchronous data cell and detects various information necessary for audio decompression to output to the de-compression circuit 26. Note that structural elements having similar functions to those in the foregoing embodiments are given the same reference numerals.

Referring to FIG. 4, when the relay channels 11a and 11b of the first CLAD device 18a in Nagoya receive signals, the ATM layer control circuit 50 thereof conducts a synchronous process to the data cell and outputs the cell to the AAL control circuit 51. The AAL control circuit 51 reads information necessary for audio decompression from the cell received and sends the information to the de-compression circuit 26. After being expanded, the cell disassembled signal has a first signal pattern inserted into it, and is then output to an STM line 20.

Upon detection of the first signal pattern, an audio one-link operation is established in Nagoya. After establishment, the cell disassembled signal is supplied from the ATM layer control circuit 50 to the pseudo signal generation circuit 32 without passing through the AAL layer control circuit 51. As described above, while an audio one-link operation is conducted, delay due to the time necessary for an AAL control process can be avoided.

Figure 14:
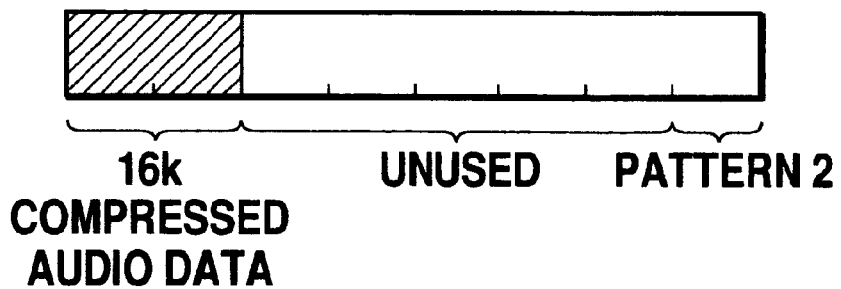
FIG. 14 illustrates an example of a pseudo expanded signal.
Figure 15:
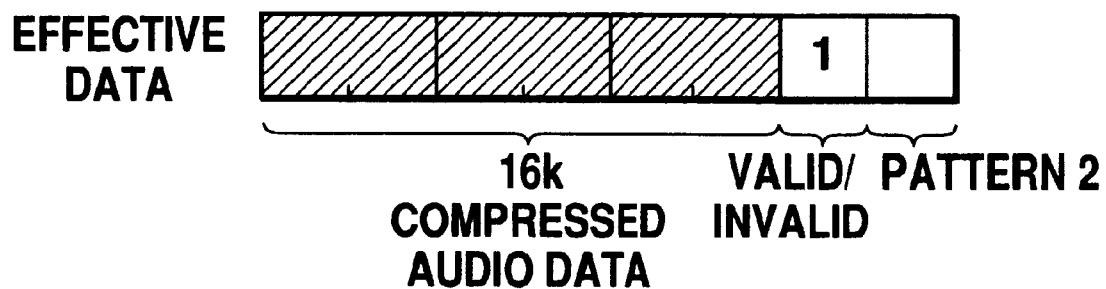
FIG. 15 illustrates another example of a pseudo expanded signal.

In the foregoing embodiments, respective 64 kbps pseudo expanded signals can contain a 16 kbps compressed signal, or the like, as shown in FIG. 14. In this event, it is possible for a 64 kbps pseudo expanded signal to contain three 16 kbps compressed signals, as shown in FIG. 15. For example, referring also to FIG. 8, when an audio one-link operation is established, the cell disassembling circuit 25 stores three 16 kbps compressed signals and outputs them to the pseudo signal generation circuit 32. In the circuit 32, a valid/invalid bit and a second sinal pattern is added to the three signals, which are then cell assembled into a data packet to be output to an STM line 20 in accordance with a 64 kbps PCM sampling time.

A CLAD device which receives a data packet from an STM line 20 detects whether or not the data packet is valid based on the valid/invalid bit within the packet. When the packet is detected as valid, the pseudo signal restoration circuit 34 dissolves the packet into 16 kbps compressed signals and cell assembles the signals into a cell before outputting the cell to the relay channels 11a and 11b.

Figure 16:
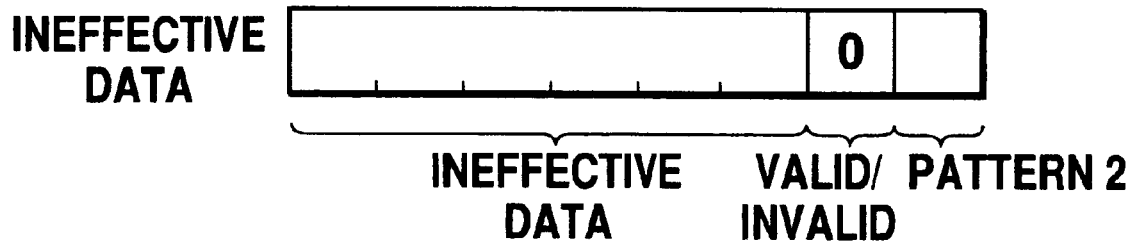
FIG. 16 illustrates still another example of a pseudo expanded signal.

As described above, the time required for converting a cell into a pseudo expanded signal is reduced through utilization of compressed data in a pseudo expanded signal. As a result, a signal is processed for a shorter time in a relay device of an intermediate station, which results in shortening delay in audio one-link operation. With the above arrangement, a non-data period is generated due to data compressed within a pseudo expanded signal, and such a period must be filled because signals are output with a constant interval in the STM. For filling such a period, invalid data as shown in FIG. 16 may be prepared. A CLAD device which received invalid data detects that the received data packet is invalid based on a valid/invalid bit thereof, and terminates signal processing until it receives valid data. Invalid data is not output to the relay channels 11a and 11b.

Figure 17:
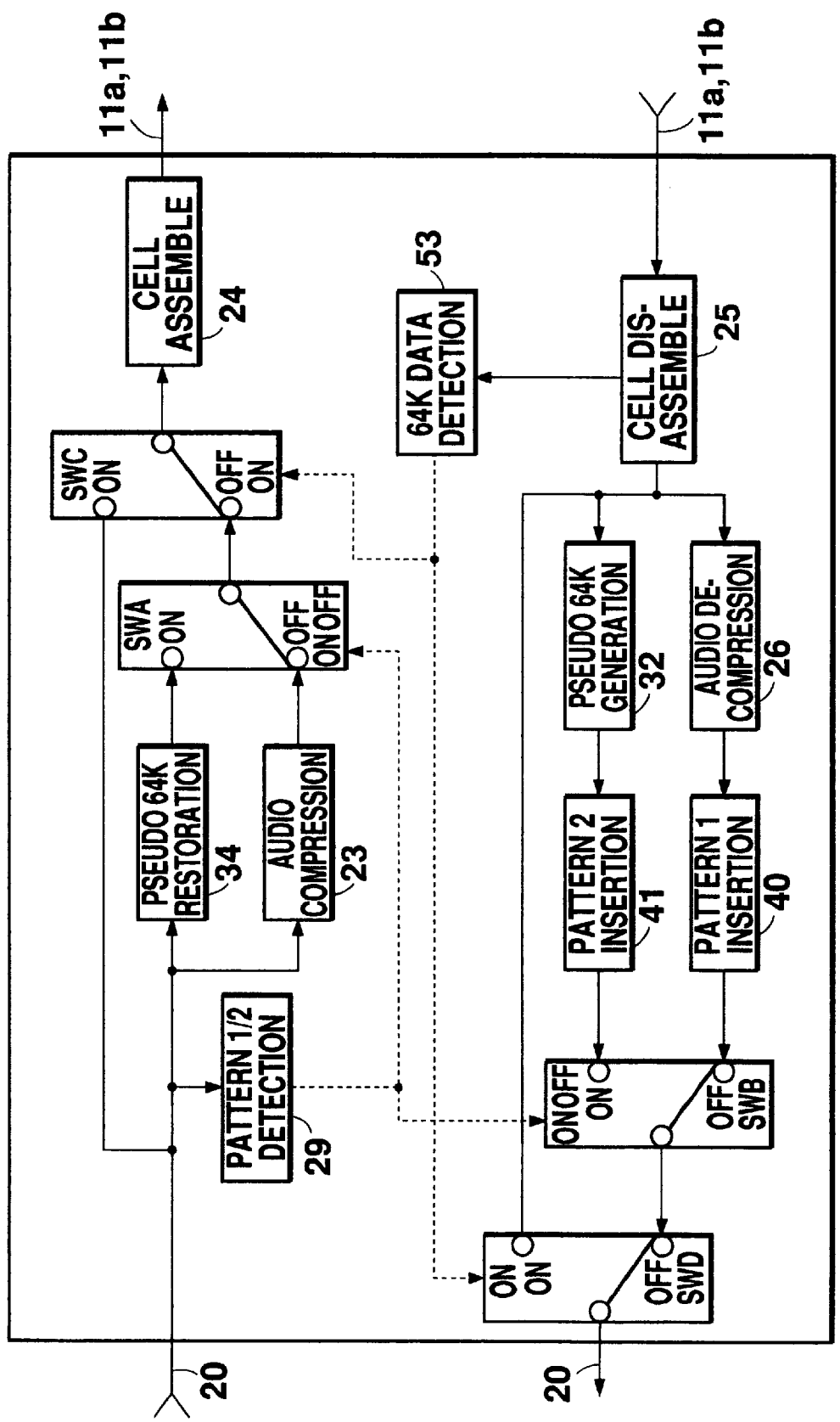
FIG. 17 illustrates the overall structure of a CLAD device according to a sixth preferred embodiment of the present invention.

FIG. 17 illustrates a CLAD device according to a sixth preferred embodiment of the present inventions wherein the cell disassembling circuit 25 is connected to a data type detection circuit 53 for detecting that the cell disassembling circuit 25 has received a signal other than a compression signal. The data type detection circuit 53 distinguishes a data type, based on the AAL information of a data cell or a modem tone signal. Switching of the third and fourth switches SWC and SWD is controlled based on this distinction. Note that structural elements having similar functions to those in the foregoing embodiments are given the same reference numerals.

Referring to FIG. 4 as well, assume that 64 kbps data cells for a facsimile, a computer, etc., are transmitted from Tokyo via the relay channel 11a to the first CLAD device 18a in Nagoya. When the data type detection circuit 53 detects receipt of a signal other than a compressed signal by the cell disassembling circuit 25, the circuit 53 switches the third and fourth switch circuits SWC and SED so that a cell disassembled signal from the cell disassembling circuit 25 is directly sent to an STM line 20 and that a cell disassembled signal from an STM line 20 is directly sent to the cell assembling circuit 24. Thus, the first and second signal patterns are not inserted into a data cell whose 64 kbps data region is fully utilized, so that an integral data without first and second signal patterns inserted thereto is transmitted. With this arrangement, the present invention can be applied to a multimedia communication using a computer, or the like.

What is claimed is:

1. A multistage relay device comprising
   a compression circuit for compressing a signal conforming to STM to generate a compressed signal;
   a cell assembling circuit for cell assembling the compressed signal into a cell for outputting as a data cell conforming to ATM to a relay channel;
   a cell disassembling circuit for cell disassembling a data cell received from the relay channel into a cell disassembled signal conforming to STM;
   a restoration circuit for expanding the cell disassembled signal to generate an expanded signal;
   a pattern insertion circuit for inserting a given signal pattern into a signal received for outputting to an STM line;
   a pattern detection circuit for detecting whether or not the signal received from the STM line contains a signal pattern inserted thereto;
   a first sub-path circuit for supplying, without expansion, the cell disassembled signal from the cell disassembled circuit to the pattern insertion circuit when the pattern detection circuit detects the signal pattern; and
   a second sub-path circuit for supplying, without compression, the cell disassembled signal from the STM line to the cell assembling circuit when the pattern detection circuit detects the signal pattern.

2. A multistage relay device according to claim 1, wherein the first sub-path circuit includes
   a pseudo signal generation circuit for converting a cell disassembled signal from the cell disassembling circuit to a pseudo expanded signal when the pattern detection circuit detects the signal pattern; and
   a first switch circuit for supplying a cell disassembled signal from the cell disassembling circuit to either the pseudo signal generation circuit or the restoration circuit.

3. A multistage relay device according to claim 2, wherein the second sub-path circuit includes a pseudo signal generation circuit for converting the pseudo expanded signal from the STM line to a cell disassembled signal when the pattern detection circuit detects the signal pattern; and a second switch circuit for supplying either a signal conformity to STM or a pseudo expanded signal from the STM line to either the pseudo signal restoration circuit or the compression circuit.

4. A multistage relay device according to claim 3, wherein the pattern insertion circuit includes a first pattern insertion circuit for inserting a first signal pattern into an expanded signal from the restoration circuit; and a second pattern insertion circuit for inserting a second signal pattern into a cell disassembled signal from the first sub-path circuit, and the pattern detection circuit switches between the first and second switch circuits, based on detection of the first and second signal patterns.

5. A multistage relay device according to claim 1, wherein the pattern insertion circuit and the pattern detection circuit are connected to a control circuit for determining an occupation ratio of the signal pattern in the signal.

6. A multistage relay device according to claim 1, wherein the pattern detection circuit is connected to a control circuit for determining a number of times for a signal pattern to repeat which is necessary to recognize insertion of the signal pattern.

7. A multistage relay device according to claim 1, further comprising a pattern discontinuation detection circuit for supplying a signal received from the STM line to the compression circuit and not to the second circuit while maintaining the first sub-path circuit, when the pattern detection circuit detects that the signal pattern was discontinued while a cell disassembled signal passes through the first and second sub-path circuits.

8. A multistage relay device according to claim 7, further comprising a signaling circuit for supplying a cell disassembled signal to the restoration circuit instead of to the first sub-path circuit and to the compression circuit instead of to the second sub-path circuit, upon detection of disconnection of communication channel.

9. A multistage relay device according to claim 7, wherein the pattern discontinuation detection circuit recognizes disconnection of communication channel when the signal pattern was discontinued and a non-audio state continues over a given period of time.

10. A multistage relay device according to claim 1, the cell disassembling circuit includes a cell delay variation (CDV) absorption circuit for outputting cell disassembled data in accordance with a constant STM cycle, wherein a cell disassembled signal is supplied to the first sub-path circuit without passing through the fractionation absorption circuit.

11. A multistage relay device according to claim 1, further comprising a buffer for switching between execution and non-execution of cell delay variation (CDV) absorption so as to output cell disassembled data in a constant STM cycle in response to a detection result by a pattern insertion circuit.

12. A multistage relay device according to claim 1, wherein the cell disassembled circuit includes an AAL control circuit for controlling AAL information, wherein a cell disassembled signal is supplied to the first sub-path circuit without passing through the AAL control circuit.

13. A multistage relay device according to claim 4, wherein the cell disassembled circuit holds data effective for information transmission and collectively supplying the data held to the pseudo signal generation circuit.

14. A multistage relay device according to claim 1, wherein the cell disassembled circuit is connected to a data type detection circuit for detecting that the cell disassembling circuit has received a signal other than a compressed signal, and this cell disassembling circuit supplies a cell disassembled signal directly to an STM line when the data type detection circuit detects that the cell disassembling circuit has received a signal other than a compressed signal.

15. A multistage relay device according to claim 1, wherein the pattern insertion circuit and the pattern detection circuit are connected to a control circuit for determining content of the signal pattern.

* * * * *